July 6, 1965     E. NAGY     3,192,827
LENSLESS SLIDE PROJECTION APPARATUS
Filed May 22, 1961     5 Sheets-Sheet 1

INVENTOR.
ELEMER NAGY
BY
ATTORNEYS

July 6, 1965  E. NAGY  3,192,827
LENSLESS SLIDE PROJECTION APPARATUS
Filed May 22, 1961  5 Sheets-Sheet 2

INVENTOR.
ELEMER NAGY
BY
ATTORNEYS

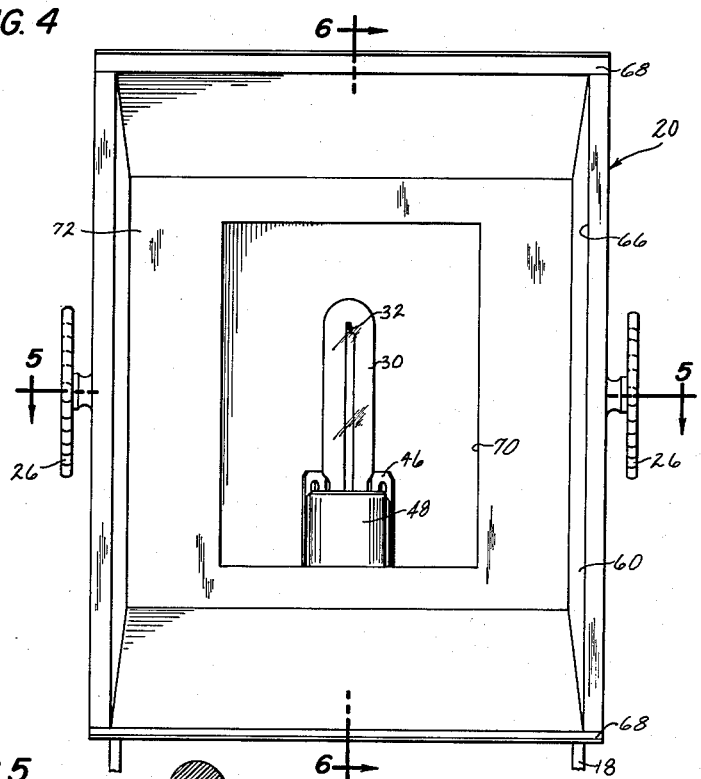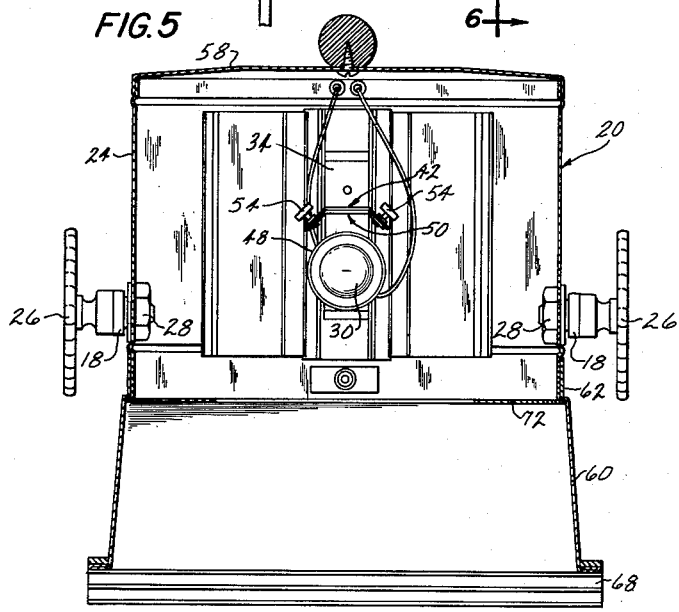

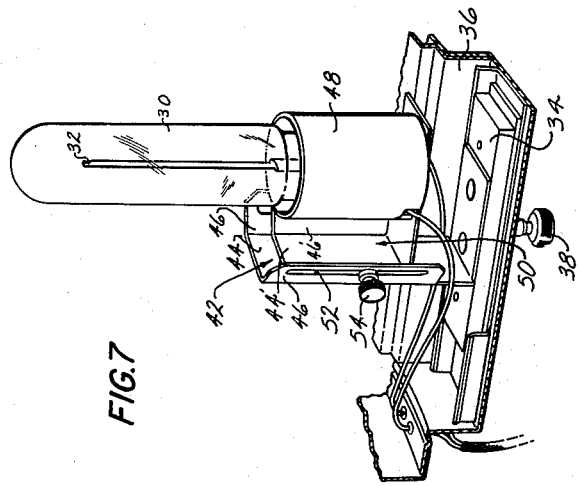

July 6, 1965 E. NAGY 3,192,827
LENSLESS SLIDE PROJECTION APPARATUS
Filed May 22, 1961 5 Sheets-Sheet 5

INVENTOR.
ELEMER NAGY
BY
ATTORNEYS

United States Patent Office 3,192,827
Patented July 6, 1965

3,192,827
LENSLESS SLIDE PROJECTION APPARATUS
Elemer Nagy, 21 Beverly Road, West Hartford, Conn.
Filed May 22, 1961, Ser. No. 111,666
3 Claims. (Cl. 88—24)

This invention relates generally to projecting representations for providing scenery, instructions, artistic portrayals and for a variety of other purposes and has particular utility in stage presentations to provide background scenery therefor. More particularly, this invention relates to a novel slide projector apparatus for projecting slide images upon a screen.

It is a principal object of this invention to provide a novel projection apparatus which can produce stage scenery with clarity and accuracy and which can provide a large variety of scenery representations and portray these representations undergoing either a gradual or rapid change.

It is another object of this invention to provide improved projection apparatus for producing stage scenery which can be readily and conveniently carried out for creating and changing the scenery representations and which enables the scenery portrayals to be reproduced at new locations through the transportation of a very small amount of equipment and without requiring movement of the bulky and cumbersome stage scenery panels.

It is a further object of this invention to provide an improved slide projection apparatus which can project and accurately superimpose upon a screen the representations from a plurality of slides and which can vary the intensity of the projected representations for varying the over-all portrayal created therefrom.

It is a still further object of this invention to provide an improved slide projection apparatus that has a simple arrangement of parts and which provides a clear and sharp projected representation without the use of optical lenses.

Other objects will be in part obvious and in part pointed out more in detail hereinafter.

The invention accordingly resides in the features of construction, combination of elements, and arrangement of parts as hereafter set forth and in the scope of the application which will be indicated in the appended claims.

In the drawings:

FIG. 4 is an enlarged fragmentary front elevation view of the projector unit of FIG. 3 with the projector slides removed, taken substantially along the line 4—4 of FIG. 3;

FIG. 5 is a section view of the projector unit taken substantially along the line 5—5 of FIG. 4;

FIG. 6 is a fragmentary sectional view of the projector unit taken substantially along the line 6—6 of FIG. 4;

FIG. 7 is a fragmentary perspective view of a projector unit bulb and bulb support.

Figure 1:
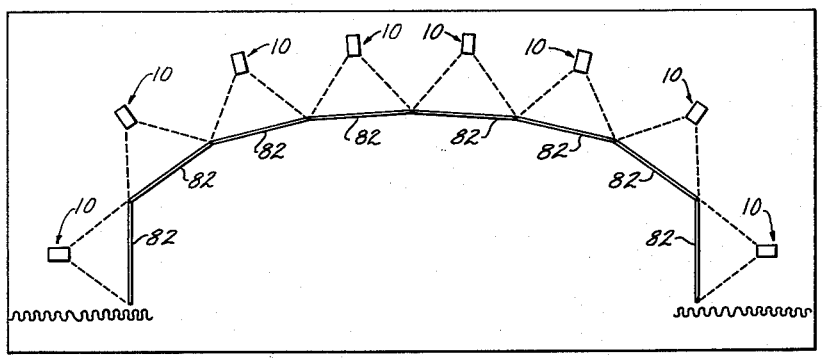
FIG. 1 is a top plan diagrammatic view of a plurality of projection assemblies incorporating the apparatus of this invention placed upon a stage in one arrangement.

The projections method and apparatus of this invention is useful for providing representations for a number of purposes such as to convey information and instructions, and to portray a variety of artistic patterns and pictures. For simplicity, however, and in order that the method and apparatus of this invention may be fully understood, it will be desicribed for producing and developing stage scenery for a stage production.

Referring to the drawings in detail, a projector unit of this invention, generally designated by the numeral 10, is shown to include an upright portable stand 12 having three casters 14, three manually adjustable anchoring stops 16 and a rectangularly shaped upstanding yoke 18 on which are mounted a pair of projectors 20 and 22.

Figure 2:
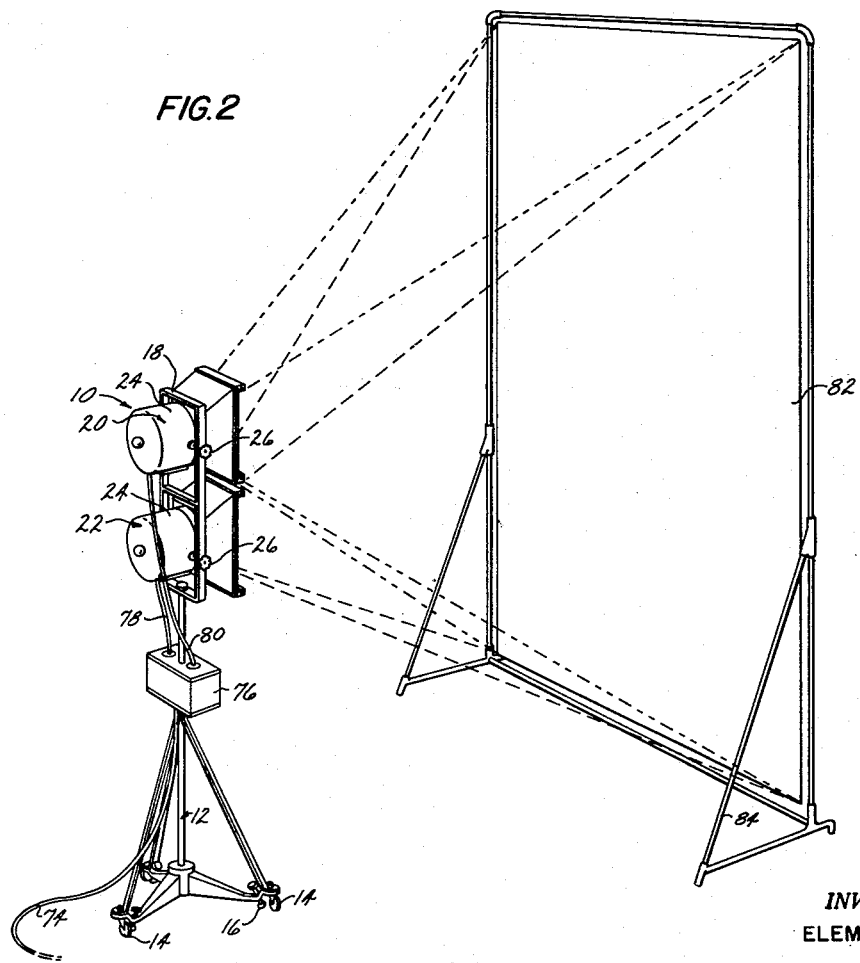
FIG. 2 is an enlarged perspective view of one of the projection assemblies of FIG. 1 showing a projector unit and screen in detail.

As best seen in FIGS. 2 and 6, the projectors 20 and 22 have similar projector housings comprising cylindrical housing members 24 that are pivotally mounted upon the yoke 18 on parallel horizontally extending axes by knobs 26 having shanks (not shown) received within apertures in the yoke and threaded into nuts 28 fixed to the cylindrical housing members 24. Therefore, the projectors 20 and 22 can be readily adjusted about their pivotal axes by unscrewing the knobs 26. The housing members 24 have longitudinally extending axes centrally located therein which intersect with and are substantially perpendicular to their pivotal axes so that pivotal movement of the housing member 24 moves their longitudinal axes in a vertical plane.

For providing a light source, there is mounted within each of the cylindrical housing members 24 either an arc lamp (not shown) or preferably an electric incandescent bulb or lamp 30 having an incandescent filament 32 therein. The bulb filament 32, or the arc where an arc lamp is used, is preferably less than one quarter of an inch in length so as to provide a light source that is equivalent to a point light source insofar as the projection unit 10 of this invention is concerned. Such bulbs are well known; for example, commercial bulbs are available which have horizontally and vertically extending filaments, respectively, of approximately one quarter of an inch in length.

In order to vertically raise and lower the lamp 30 within the housing member 24, there are provided a pair of contiguous upstanding sheet metal bulb support plates 42 and 50 which have central portions 44 and 44' and wing portions 46 and 46' extending angularly from the lateral sides thereof. A bulb socket 48 is fixed to the support plate 50, and a pair of elongated vertically extending slots provided in the wing portions 46 receive a pair of knobs 54 that threadedly engage the wing portions 46' for adjustably securing the bulb filament 32 in a selected vertical position.

For moving the bulb 30 parallel to the longitudinal axis of the housing member 24, the upstanding sheet metal plate 42 is fixed to a base plate 34 that is slidably received within a depending rectangularly shaped trough 36 formed on the lower portion of the cylindrical housing member 24. The base plate 34 is adjustably fixed in the trough 36 by a knob 38 having a shank received within an elongated slot 40 (FIG. 6) in the trough 36 and threaded into the base plate 34.

Electrical power is supplied to the bulbs 30 from a power source (not shown) via an electrical conduit 74, a transformer 76 where such is found to be necessary, and individual electrical conduits 78 and 80 leading to the bulbs 30. Conventional electrical switches and voltage controlling means (not shown) are connected in series with each of the conduits 78 and 80 to provide means for manually energizing and regulating the intensity of each bulb 30; or, in the alternative, means could be provided for automatically switching and controlling the voltage applied to each filament according to a programmed arrangement.

Apertures 56 in the upper portion of the housing member 24 and similar apertures (not shown) in the lower portion of the housing are provided to allow air flow through the housing for decreasing the temperature of the bulb and the air within the housing.

Figure 3:
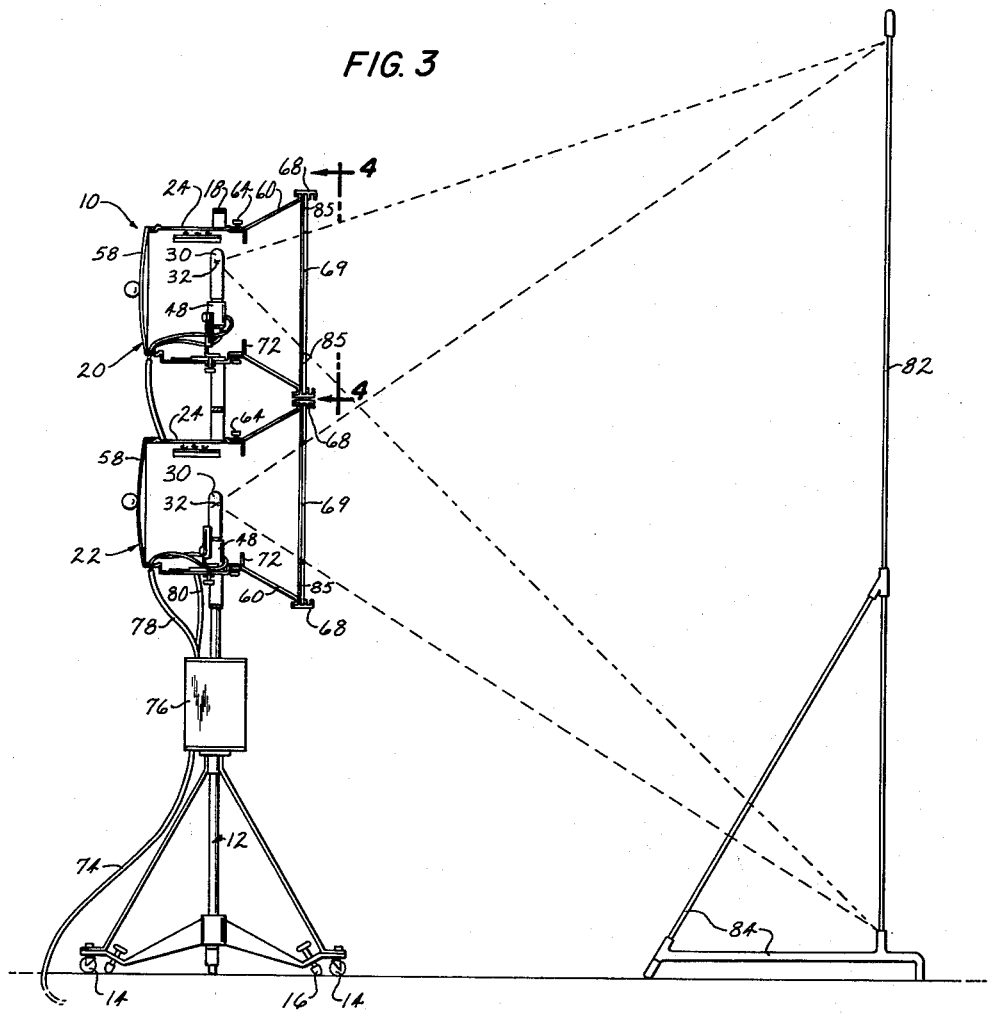
FIG. 3 is an enlarged side elevation view partly broken away and partly in section of the projector unit and screen assembly of FIG. 2.

A backing plate 58 is fixed to the rear end of the cylindrical housing member 24, and a truncated pyramid-shaped housing member 60 is mounted upon the forward end of the housing member 24 by an annular flange 62 for rotation about the longitudinal axis of the housing. The housing member 60 is secured onto the cylindrical housing member 24 by means of a pair of knobs 64 that are threaded within lugs affixed to the annular flange 62 for adjustment in and out of engagement with the cylindrical housing member 24. As best viewed in FIG. 4, the truncated pyramid-shaped housing member 60 defines an outer rectangular opening 66 that lies in a plane extending substantially perpendicular to the longitudinal axis of the housing. For retaining one or more transparent slides 69 (FIG. 3) adjacent the opening 66, there are provided a pair of guides 68 fixed to opposed sides of the housing 60, and the slides are easily inserted and removed from the projector unit by moving them laterally upon the guides. All of the inner surfaces within the projector housing members 24 and 60 are coated with a flat black paint or otherwise finished so as to form a mat surface for absorbing the light rays and thereby reduce the reflection of light rays through the opening 66. Additionally, to substantially eliminate all reflection of light rays from the inner surface of the housing member 60, a light baffle 72 extending inwardly from the housing member 60 is positioned between the filament 32 and the inner surface of the housing member 60 so as to block light rays emanating from the filament toward that surface. The baffle defines a second rectangular opening 70 that is smaller than and angularly aligned with the opening 66 and which lies in a plane that is spaced from and parallel to the plane of the opening 66.

Figure 8:
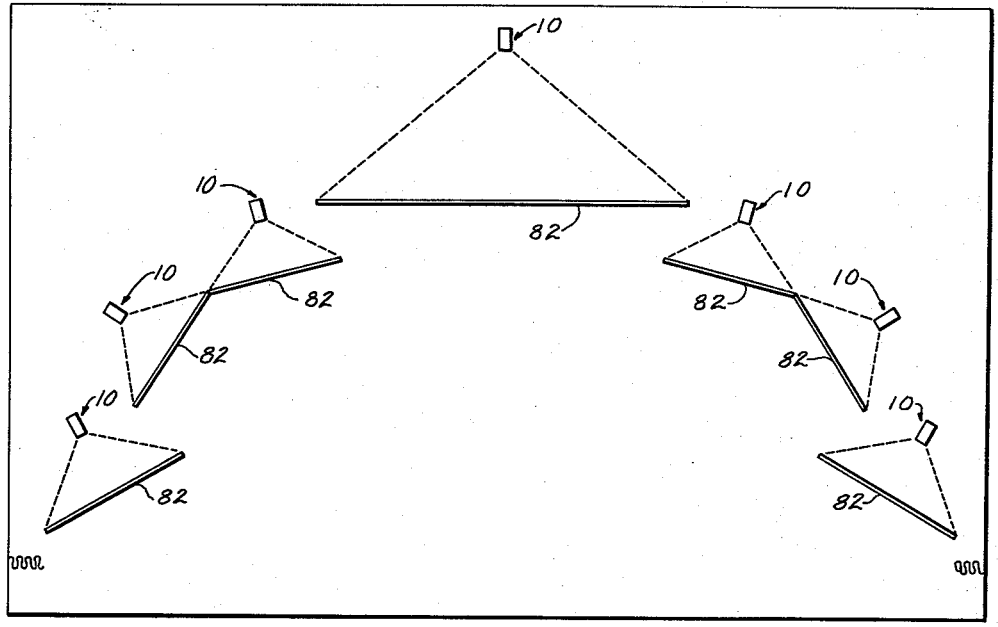
FIGS. 8 and 9 are top plan diagrammatic views of a plurality of projector assemblies placed upon a stage in second and third arrangements.
Figure 9:
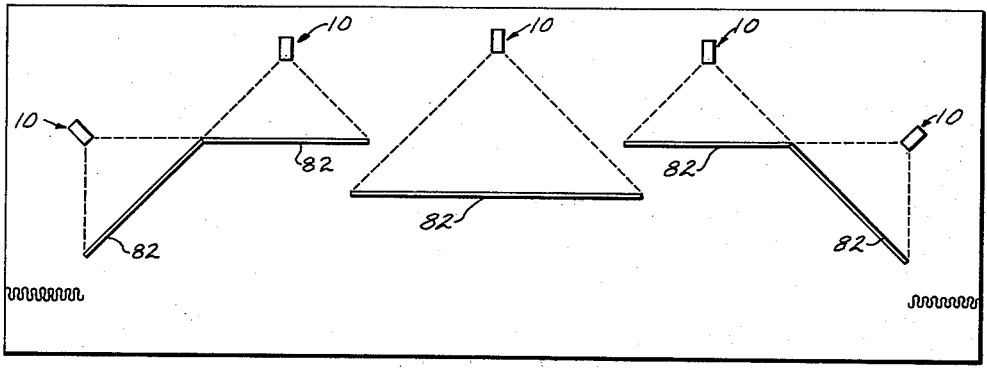

For carrying out the projection of this invention, the projector unit 10 is used for projecting an image onto an upstanding screen 82 that is supported as by brackets 84 at a suitable distance therefrom. A single projector unit and screen assembly, shown in FIG. 2, can be used for projecting an image on a limited area; however, this invention is particularly useful and advantageous where the screens are made of a translucent material, as for example, fiberglass and a number of the screens are situated as upon a stage for defining a complete scenery outline for a dramatic production or other stage performance and with a projector unit behind each screen. Three examples of scenery outlines are shown in FIGS. 1, 8 and 9; however, as the projector units and screens can be easily moved and arranged upon the stage, numerous other scenery outlines could be readily provided according to the dictates of the production for which they are used.

For portraying scenery on the screens 82, the projector units 10 are positioned so that the projectors 20 and 22 can be pivoted about their horizontal axes to project representations of their slide images upon the screens. As the dimension between the opposing edges of the opaque border 85 of the transparent slide 59 (or the dimension between the opposing edges of the opening 66 where there are no opaque edges on the slides), and the position of the light filament 32 relative thereto determine the dimension and position of the projected image upon the screen for any given distance between the screen 82 and the projector unit 10, minute adjustments in the size and position of the projection can be made by adjusting the longitudinal and vertical position of the filament 32 within the projector housing, by pivotally adjusting the projectors within the yoke 18, and by rotating the housing member 60 and its supported slide 69 upon the housing member 24. Further, since the filaments in each of the projectors 20 and 22 can be independently adjusted, their projected representations can be accurately superimposed.

For projecting scenery upon the translucent screens 82, the appropriate transparent slides are inserted into the guides 68 and the filaments of one or both of the projectors of each projector unit are energized. The intensity of each of the bulbs can be varied according to the specific needs, and as the lighting of the scenery does not depend upon the stage lighting, but is entirely independent therefrom, a great deal of flexibility in the scenery intensity is possible even though the stage lighting is different therefrom.

The projection system of this invention makes it possible to obtain a variety of unique scenery representations by a number of different conveniently usable methods. For example, in one method of producing scenery, a single projector of each projector unit 10 could be initially energized to project the scenery image of its slide upon the screen, and subsequently, the first projector could be de-energized and the second projector simultaneously energized for bringing about an instantaneous change in scenery. The scenery change could, however, be brought about more slowly by slowly reducing the intensity of the bulb in the first projector and concomitantly slowly increasing the intensity of the bulb in the second projector thereby giving the scenery a more gradual transition for providing continuity of scenes.

The projector system of this invention can also portray scenery undergoing a gradual or evolutionary change, as for example, a portrayal of a countryside passing into the winter, autumn or spring phase in the annual cycle of nature. This can be accomplished by placing on one projector of each projector unit a slide having a picture of the countryside profile, as for example, trees and the like, and placing on the second projector a slide having a picture of the embellishing elements of nature such as snow or grass and leaves. Then by projecting the countryside profile and simultaneously slowly increasing or decreasing the intensity of the superimposed projection from the second projector, the scenery can be depicted evolving from autumn into winter, winter into spring or summer into fall.

Further, where abstract or other types of modern art representations are to be produced, the projections from the two projectors can be continuously gradually increased and decreased in intensity in an out-of-phase relationship for providing a life-like movement in the projected representations and thereby giving a new dimension through which the modern art forms have greater expression.

The projection apparatus of this invention is, therefore, extremely useful for producing a number of different types of representations with accuracy and rapidity, and, where this invention is used for producing stage scenery, it greatly reduces scenery handling and the time delay resulting therefrom. Additionally, the projector unit of this invention, though of simple construction and without complex optical lenses, can accurately and clearly project a representation formed from one or more slide images and, therefore, provides a variety of capabilities not previously available.

As will be apparent to persons skilled in the art, various modifications and adaptations of the projection apparatus and method above described will become readily apparent without departure from the spirit and scope of the invention, the scope of which is defined in the appended claims.

I claim:
1. A lensless slide projector unit, comprising; a support, a pair of slide projectors mounted upon said support, said projectors having housings with substantially parallel longitudinal axes, said projector housings having first portions and second portions rotatably mounted thereon for adjustment about their longitudinal axes, said second portions defining housing openings at one end thereof, incandescent bulbs having substantially point light sources therein mounted within said first housing portions, support means on said second housing portions for retaining transparent slides in planes extending perpendicular to the longitudinal axes, and means in at least one of the slide projectors for adjusting the longitudinal distance between its bulb and support means.

2. A lenseless slide projector unit comprising, an upright stand, a pair of slide projector housings pivotally mounted upon the stand above parallel axes and having a longitudinal axes extending substantially perpendicular therefrom, said housings having first portions and second portions rotatably mounted thereon for adjustment about their longitudinal axis, slide support means on said second housing portions, said second portions defining housing openings lying in planes extending substantially perpendicular to the longitudinal housing axes, substantially point light sources mounted within said first housing portions, means for adjustably moving the light sources longitudinally within the projector housings, and means in at least one of the housings for adjustably moving its light source in a path extending perpendicular to its longitudinal and pivotal axes.

3. A stage scenery system comprising, a plurality of upstanding translucent screens arranged upon a stage for defining a scenery outline, a plurality of lenseless slide projector units with first and second slide projectors positioned behind the screens respectively for projecting two independently controllable slide representations on the back side thereof respectively, each of said slide projectors having a light source therein, a first set of transparent slides inserted in said first slide projectors and having images thereon for establishing a first scenic representation upon the translucent screens, a second set of transparent slides inserted in said second slide projectors and having images thereon for establishing a second scenic representation upon the translucent screens controllable independently of the first scenic representation, and control means for independently controlling the light sources within the projectors.

References Cited by the Applicant
UNITED STATES PATENTS

| | | | |
|---|---|---|---|
| 486,606 | 11/92 | Seymour. | |
| 1,263,355 | 4/18 | Artigue. | |
| 1,282,743 | 10/18 | Brenkert | 88—26 |
| 1,310,959 | 7/19 | O'Hara | 88—24 |
| 1,553,783 | 9/25 | Le Hew | 88—24 |
| 1,566,260 | 12/25 | Halvorson | 88—24 |
| 1,635,795 | 7/27 | Linnebach | 272—10 |
| 1,654,391 | 12/27 | Thornton | 88—24 |
| 2,077,111 | 4/37 | Kent. | |
| 2,116,114 | 5/38 | Guidorossi | 272—10 |
| 2,204,435 | 6/40 | Musaphia | 40—106.52 |
| 2,252,513 | 8/41 | Koehl | 88—28 X |
| 2,957,399 | 10/60 | Wattier | 88—24 X |

FOREIGN PATENTS

| | | |
|---|---|---|
| 320,064 | 10/29 | Great Britain. |

NORTON ANSHER, *Primary Examiner.*

WILLIAM MISIEK, *Examiner.*